(12) United States Patent
Ruge

(10) Patent No.: US 8,290,617 B2
(45) Date of Patent: Oct. 16, 2012

(54) ROBOT SYSTEM FOR LOADING EQUIPMENT WITH GENERAL CARGO UNITS

(75) Inventor: Gerda Ruge, Augsburg (DE)

(73) Assignee: Kuka Roboter GmbH, Augsberg (DE)

( * ) Notice: Subject to any disclaimer, the term of this patent is extended or adjusted under 35 U.S.C. 154(b) by 510 days.

(21) Appl. No.: 12/521,603

(22) PCT Filed: Jan. 5, 2008

(86) PCT No.: PCT/EP2008/000042
§ 371 (c)(1),
(2), (4) Date: Jun. 29, 2009

(87) PCT Pub. No.: WO2008/083936
PCT Pub. Date: Jul. 17, 2008

(65) Prior Publication Data
US 2010/0324729 A1    Dec. 23, 2010

(30) Foreign Application Priority Data
Jan. 8, 2007   (DE) .......................... 10 2007 001 263

(51) Int. Cl.
*B65G 57/02* (2006.01)
*B65G 61/00* (2006.01)
*B25J 9/02* (2006.01)
*G06F 7/00* (2006.01)
*B65G 47/90* (2006.01)

(52) U.S. Cl. ............. 700/245; 700/246; 700/217; 901/2

(58) Field of Classification Search ........... 700/213–264
See application file for complete search history.

(56) References Cited

U.S. PATENT DOCUMENTS

| | | | |
|---|---|---|---|
| 5,087,169 A * | 2/1992 | Tubke ........................ | 414/792.9 |
| 5,175,692 A * | 12/1992 | Mazouz et al. ................ | 700/217 |
| 5,501,571 A * | 3/1996 | Van Durrett et al. .......... | 414/801 |
| 5,908,283 A | 6/1999 | Huang et al. | |
| 7,266,422 B1 * | 9/2007 | DeMotte et al. .............. | 700/217 |
| 2002/0106273 A1 * | 8/2002 | Huang et al. ................ | 414/788.1 |
| 2005/0125101 A1 * | 6/2005 | Brust et al. .................... | 700/245 |
| 2010/0221094 A1 * | 9/2010 | Kuehnemann et al. ....... | 414/788 |
| 2010/0249988 A1 * | 9/2010 | Baldes et al. ................. | 700/217 |

OTHER PUBLICATIONS

"Stability Aspects of Pallet Loading," Bischoff, OR Spektrum, vol. 13 (1991) pp. 189-197.
"Verfahren zum Automatischen Palettieren von Quraderförmigen Packstücken im Beliebigen Sortenmix," Strommer (1992).

* cited by examiner

*Primary Examiner* — Khoi Tran
*Assistant Examiner* — Dale Moyer
(74) *Attorney, Agent, or Firm* — Schiff Hardin LLP

(57) ABSTRACT

In a robot system, and a method for operating a robot system, for loading general cargo units, a gripper unit of the robot is operated to stack the general cargo units in a stack, by movements controlled by a computerized control unit. In order to avoid unstable loading patterns, the computerized control unit automatically determines the loading pattern of the stack of general cargo units, and also automatically determines at least one characteristic that represents the stability of the loading pattern.

18 Claims, 3 Drawing Sheets

ROBOT SYSTEM FOR LOADING EQUIPMENT WITH GENERAL CARGO UNITS

BACKGROUND OF THE INVENTION

1. Field of the Invention

The invention arises from a robot system for loading equipment with general cargo units (piece goods), wherein the robot system has a gripper unit for gripping the general cargo units and a control unit for controlling the movements of the gripper unit and to determine a loading pattern of the general cargo units. The invention also concerns a method to control a robot system of the aforementioned type.

2. Description of the Prior Art

It is known to use industrial robots (in particular articulated robots) to load equipment with general cargo units, in particular to palletize (thus to load pallets with packages). Industrial robots are thereby in particular used to automate the loading of pallets with packages of different sizes with arbitrary type mix, while palletizing with homogeneous packing units (in particular with the same packing unit heights) can typically be conducted quickly and cost-effectively with automatic palletizing units). An overview of prevalent palletizing methods is provided by the monograph "Verfahren zum automatischen Palettieren von quaderformigen Packstucken in beliebigen Sortenmix" by Walter Michael Strammer, Springer-Verlag 1992. The known methods for the determination of the package positions of individual general cargo units are predominantly designed for the optimization of the degree of filling. Aspects of the stability of the loading patterns or, respectively, of the stack corresponding to the loading patterns are in all cases taken into account with low priority in a global manner when multiple selection possibilities with the same degree of filling result. The stability is then not calculated or determined, rather the loading patterns are selected so that a certain stability can be expected based on heuristic considerations.

Various heuristic algorithms for homogeneous, cuboid general cargo are described by E. E. Bischoff in: "Stability aspects of pallet loading" OR Spektrum (1991) 13: 189-197, Springer Verlag 1991. However, the heuristic algorithms are significantly limited in practice to the effect that package positions in which one general cargo unit lies on at least two other general cargo units are preferred over those package positions in which the considered general cargo unit rests on only one other general cargo unit, such that a limitations arises and towers are avoided.

In particular given very heterogeneous general cargo, the question of the stability or of the tipping moment of a loading pattern is very complex, and a persistent calculation is not possible since no complete description of the objects exists. Elasticity, damage, precise position of the center of gravity and other things are normally unknown. Error tolerances add to this. The size of the packages is only known to approximately 0.5 cm in each direction. A determination can therefore in particular not be conducted in real time by control computers of known robot systems, thus not in a time period that is small in comparison to typical or desired load times. Therefore the question of the stability of a loading pattern or, respectively, of a package stack generated by the robot system remains open, such that a complicated wrapping (for example made of film) is necessary in any case for transport.

SUMMARY OF THE INVENTION

In order to solve the aforementioned problems, according to the invention the control unit of the robot system is configured to determine at least one parameter for stability of the loading pattern or, and a parameter for a stability of the loading pattern is determined in the method according to the invention. It can thereby be decided in a simple manner whether the loading pattern is sufficiently stable or not. The parameter can answer this decisive question in a simple manner without all forces and tipping moments having to be calculated in three dimensions in a complete static evaluation. Rather, in the assessment the determination of the parameters can be limited to the essential criteria, and only those intermediate values that are decisive for the value of the parameter must be calculated.

In a preferred embodiment of the invention, the ratio of the actual footprint of an object to the actual provided bearing area—of this object on one or more underlying objects—enters into the determination.

A robot, in particular an industrial robot with multiple freely programmable and possibly sensor-guided axes with end effectors and all additional peripheral components and gripping tools that are required to fulfill the respective task should be understood as a "robot system". A general cargo unit according to DIN 30781 is an individual article of stock that can be handled per piece and enters into the transport formation or into the loading pattern. Robot systems of the aforementioned type are particularly advantageously usable in connection with general cargo elements that can also be designated as packing units or packages according to DIN 55405.

Due to the good manipulation capability and the relatively easily achievable stability, the robot system according to the invention or and the method according to the invention can be particularly advantageously used to pack cuboid general cargo units or packages. As used herein, "configured" in this context encompasses "designed" and "equipped".

The robot system according to the invention can be used to determine the loading pattern given unknown commission, i.e. when packages of previously unknown size and unknown weight are supplied in succession via a transport device and, at most, a low number of packets or, respectively, general cargo units can be stored in a buffer before the loading. The control unit then calculates the stability of the package stack (which is already partially piled in a partial loading pattern) if it were expanded by one or more package from the package buffer. Using the parameter, the control unit compares the stability of various possible loading pattern differing by a different package position and a different selection of the additional packages.

The robot system also can be used to determine the loading pattern given a known commission, i.e. given a known selection of general cargo units that should be stowed on the loading unit. The control unit thereby calculates the stability of the entire loading pattern (which can also be generated in a sequential algorithm) and compares the parameter with the parameters of other possible loading patterns.

In an embodiment of the invention, the control unit is configured to select a load pattern from multiple load patterns depending on the parameter for the stability. However, it would also be conceivable to only make the determination of stability and to account for the parameter merely for use in downstream transport processes, or in the selection of a packaging of the loaded loading unit.

If the control unit is designed to set the position of the general cargo units relative to one another, the size of the general cargo units and/or the weight of the general cargo units enter into the determination of the parameter, factors that are decisive for the stability can be calculated for the parameter in a simple manner.

For the static situation and determination of the standing moment, a center of gravity position is assumed insofar as this cannot be calculated from other factors.

The control unit can also be configured to calculate the distance of the center of gravity of at least one general cargo unit or the group of general cargo units from a tipping edge of the general cargo unit or of the group of general cargo units from the aforementioned factors. What should be designated as a "tipping edge" in this context is a horizontal edge on which the object (thus the general cargo unit or the group of general cargo units) can be tipped. In particular, the edges of the floor of the object and the edges of a footprint on which the object stands and the simultaneous portion of the convex casing of the footprint are tipping edges.

A particularly significant parameter for the tipping safety can be obtained when the control unit forms a ratio of the distance of the center of gravity from the tipping edge of the general cargo unit or the group of general cargo units to a height of the general cargo unit or the group of general cargo units, wherein the ratio of bearing area of the package on underlying packages to footprint of the packages can enter into the calculation.

The control unit can also determine a significant parameter for a tipping safety of an object depending on a ratio of the overturning moment that is required to tilt the object to the standing moment of the object. For this purpose, the minimal tilting moment of all packages and all tilting edges with direct or indirect contact is calculated for this.

A complete picture of the stability of the object in its environment can be obtained when the control unit takes into account the weight of the object as well as the vertical force components transferred from other objects onto the considered object in the determination of the standing moment of the object.

If the control unit is designed to determine at least one parameter for a density of the loading pattern of the general cargo units, additional qualitative information about the stability of the loading pattern can be obtained since, from experience, loading patterns with high density are more stable than loading patterns with low density or, respectively, utilization of space.

If the control unit is designed to propagate forces through a stack of general cargo units or, respectively, along contact surfaces between packages and the underlying surfaces, the computing effort can be decisively reduced. If a package is added, all underlying objects that have direct or indirect contact must be recalculated. Here it is advantageous that only the packages that have contact must be recalculated.

A fast and uncomplicated decision about the stability of the package configuration can be enabled when the control unit determines the parameter for the stability of the loading pattern depending on a predetermined number of features from an approximation function. Even if the approximation function might not be precise in the individual case, the precision is sufficient for the purpose.

The control unit can advantageously determine the approximation function in a training method using the loading patterns with known stability. Static calculations can thereby be foregone. A reliable estimation of the risk of a specific loading pattern can be achieved when the approximation function maps values of the features to a probability value of the associated loading patterns that indicates a probability for its stability. The approximation function can be realized via a neural network or via a statistical classification method, for example. The approximation function can be, for example, a quadratic Bayesian classifier that classifies the loading patterns into the classes "stable" and "unstable" or into different stability classes.

A distinct reduction of the computing time can be achieved if control unit is designed to take only vertical components within the loading pattern into account to determine the parameter for the stability of the loading pattern.

Although the invention is described with reference to the stacking of packages, it also encompasses the treatment of the palletizing of pallets on pallets, for example with a robot on a linear axis that travels between pallets, or the repalletizing of pallets of different sizes.

DESCRIPTION OF THE PREFERRED EMBODIMENTS

Figure 1:
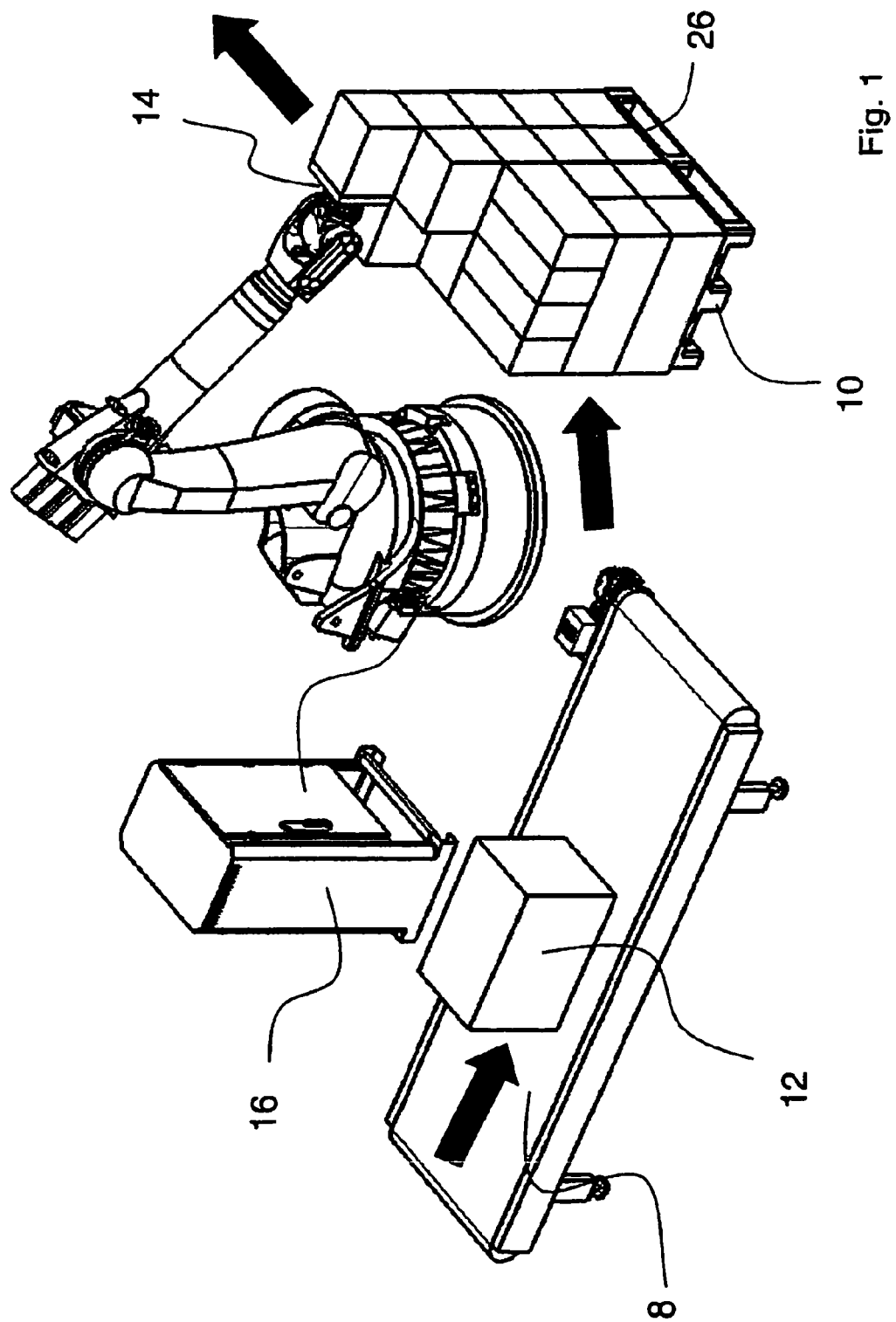
FIG. 1 illustrates a robot system for loading pallets with general cargo units, in accordance with the present invention.

FIG. 1 shows a robot system for loading equipment 10 with general cargo units 12, and in fact for loading pallets with packages. The robot system has a gripper unit 14 to grip the general cargo units 12 and a control unit 16 to control the movement of the gripper unit 14 and to determine a loading pattern of the general cargo units 12. The loading pattern contains both all information about the spatial arrangement of the general cargo units 12 and the chronological order of the loading operations. The loading pattern can particularly advantageously be presented as a sequence of loading operations.

A transport device 18 individually supplies the general cargo units 12 to the robot system, and the control unit 16 respectively calculates a loading pattern optimized according to different criteria (starting from an already-existing partial stack) as it appears after the addition of an additional general cargo unit 12. A method to control the robot system is implemented as software in the control unit 16.

Via the software the control unit 16 (which can consist of multiple PCs) is equipped to determine a parameter K for a stability of the loading pattern.

Using the parameter K for the stability, the control unit 16 selects one loading pattern from multiple loading patterns and controls the gripper unit 14 such that a package stack 26 corresponding to the selected loading pattern is created.

Figure 3:
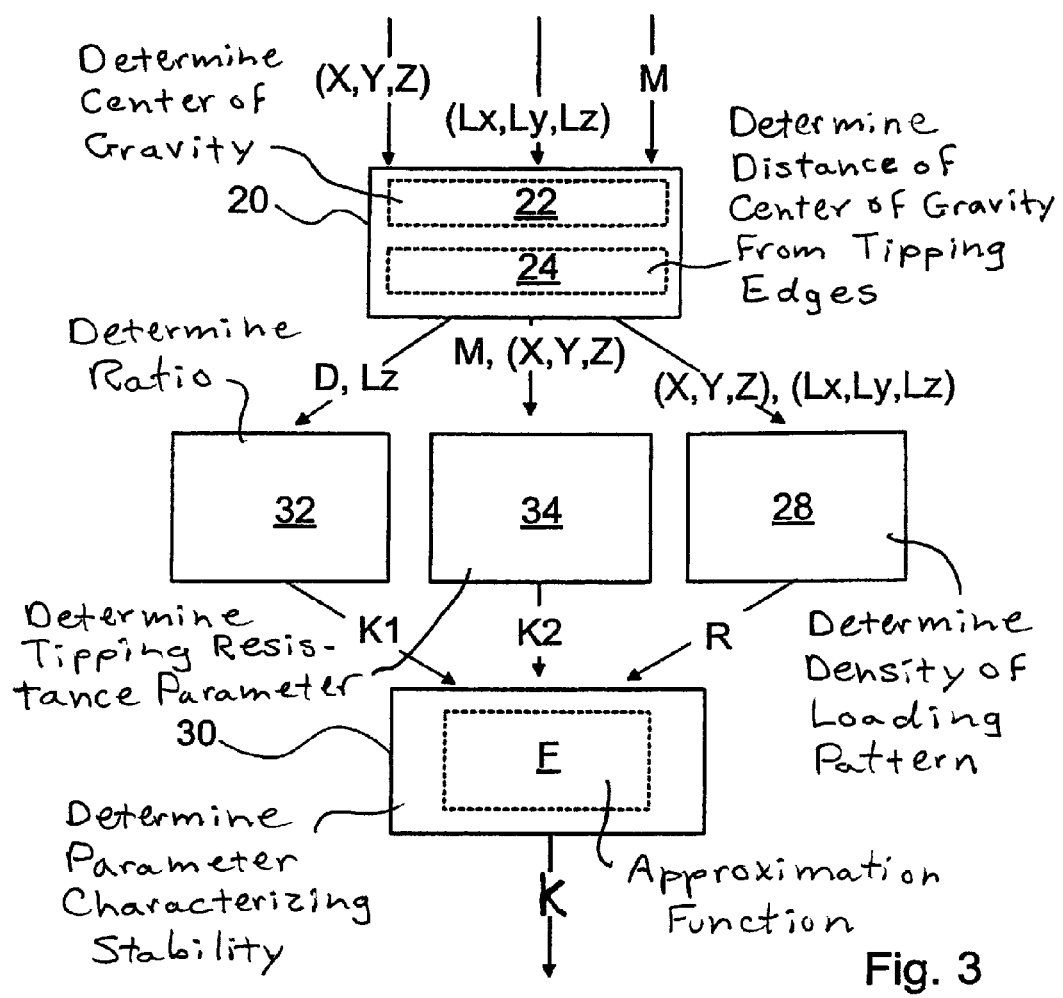
FIG. 3 is a flowchart of an embodiment of a stability assessment step in the method in accordance with the present invention.

For this purpose, the control unit 16 takes the position X, Y, Z of the general cargo units 12 relative to one another, the size Lx, Ly, Lz of the general cargo units 12 and the weight M of the general cargo units 12 into account in the determination of the parameter K in a first Step 20 (FIG. 3). The position X, Y, Z of the general cargo units 12 relative to one another, the size Lx, Ly, Lz of the general cargo units 12 and the weight M form the input variables for Step 20. For example, cameras whose image data are evaluated by the control unit 16 or an external computer in order to determine the edge lengths of the general cargo units 12 can be arranged in the region of the transport unit 18 to determine the size Lx, Ly, Lz. A scale can be integrated into the transport device 18 to determine the weight M, or the robot system can lift the general cargo unit 12 by means of the gripper unit 14 in order to determine the weight M.

Alternatively, given a known size Lx, Ly, Lz and/or known weight M the general cargo units 12 can have a machine-readable code that can be read by a corresponding reader.

Starting from the edge lengths or sizes Lx, Ly, Lz determined in such a manner, in a center of gravity determination step 22 the control unit 16 calculates the position $X_s, Y_s, Z_s$ of a center of gravity of the general cargo unit 12 delivered by the transport unit as the center point of the cuboid of the general cargo unit 12. In cases in which the weight distribution within the general cargo units 12 is known, the center of gravity can also be defined deviating from the center point of the cuboid.

In a distance determination step 24, the control unit 16 determines the distance of the center of gravity of the general cargo unit 12 from the possible tipping edges of the general cargo unit 12. For this purpose, the control unit 16 uses the position X, Y, Z of the general cargo unit 12 relative to other general cargo units 12', such that the convex shell of the placement surface in which the additional general cargo unit 12 should be placed is initially determined. The intersection of the footprint of general cargo unit 12 with the convex shell of the placement surface is subsequently determined. The edges of the intersection form the tipping edges. If the projection of the center of gravity on the footprint lies outside of the intersection, the corresponding configuration is already physically unstable. That tipping edge whose perpendicular distance from the projection of the center of gravity of the general cargo unit 12 is least is selected as the most unstable tipping edge. This distance D is stored as a distance parameter.

In a first calculation step 32, the control unit 16 also forms a ratio of the distance D of the center of gravity from the tipping edge of the general cargo unit 12 or, respectively, the distance parameter relative to a height Lz of the general cargo unit 12. This ratio is stored as a first tipping resistance parameter K1.

In a second calculation step 34, the control unit 16 additionally forms a second tipping resistance parameter K2 for a tipping resistance of a general cargo unit 12 depending on a ratio of the tipping moment of the general cargo unit 12 to the bearing force of the general cargo unit 12 or of the group of general cargo units 12. This second tipping resistance parameter K2 depends on the first tipping resistance parameter K1.

In the determination of the bearing force of the general cargo unit 12, the control unit 16 takes into account (in particular in an operating mode in which the arrangement of the general cargo units 12 is not determined sequentially but rather in groups) the weight of the general cargo unit 12 as well as the vertical force components transferred by other general cargo units 12' to the considered general cargo unit 12.

Figure 2:
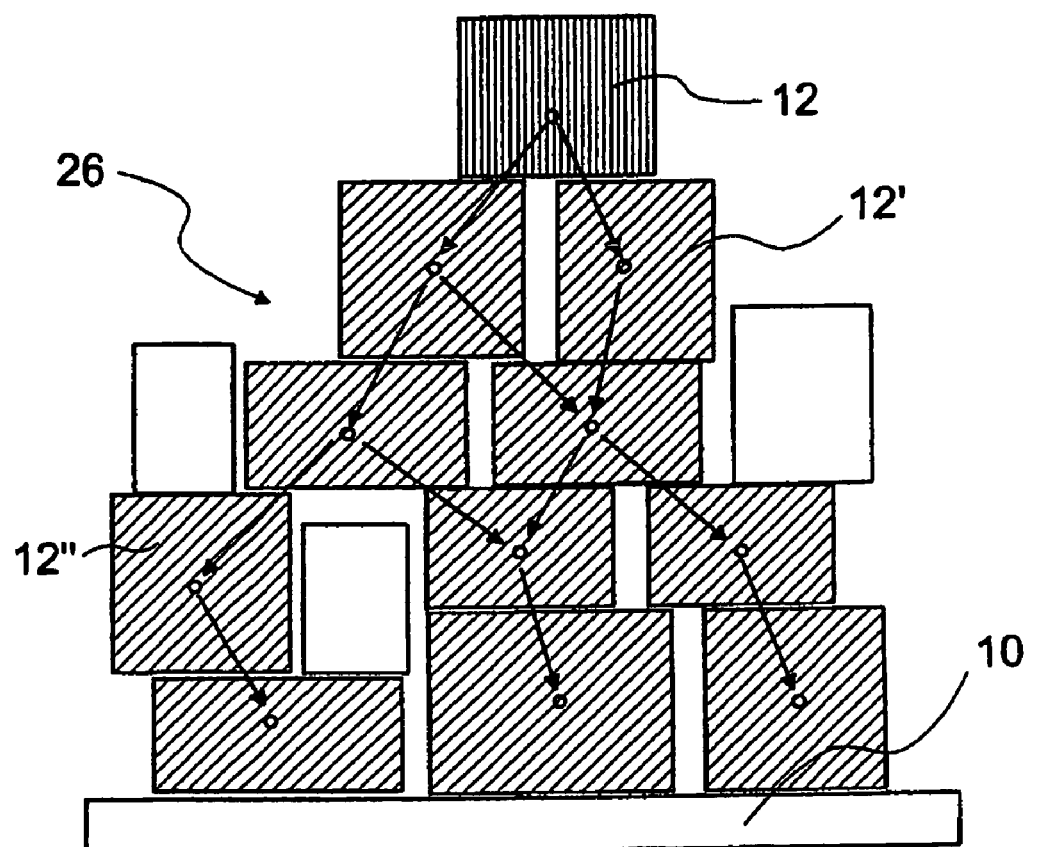
FIG. 2 schematically represents a loading pattern showing the propagation of respective weights of the cargo units in a stack.

The logic of the stability determination is schematically presented in FIG. 2. In FIG. 2, arrows illustrate the transfer of the weight of an added general cargo unit 12 to the general cargo units 12' already stacked in the package stack 26, wherein those general cargo units 12', whose bearing force is affected by the weight of the added general cargo unit 12 are emphasized with a slanted hatching. In order to minimize the computing effort, the control unit 16 propagates only the vertical components of the forces through the package stack 26. Given the evaluation of the stability or, respectively, in the selection of the optimal package position, the control unit 16 can in this way assess the effect of the added general cargo unit 12 on the entire structure since the bearing force increased by the weight of the general cargo unit 12 can also additionally stabilize underlying groups of general cargo units 12' for example, the general cargo unit 12" in FIG. 2 is clearly stabilized by the additional weight.

In a density determination step 28, the control unit 16 also determines at least one parameter for a density R of the loading pattern of the general cargo units 12. In this context the degree of the spatial filling, not the mass density, is designated as density R in percent.

The first and the second tipping resistance parameter K1, K2 and the density R (as well as possible additional features) form a predetermined number of features that are used by the control unit 16 in a parameter determination step 30 in order to determine the parameter κ for the stability of the loading pattern from an approximation function F. The approximation function F in particular requires the features (K1, K2, R) as variables.

In a training method (not shown here), the control unit 16 determines the approximation function F using loading patterns with known stability. For this the loading patterns and the known information about the stability of the associated loading are input into the training method. The information can be obtained empirically in that the robot system constructs the loading pattern and stability tests are conducted.

The approximation function F that is thereby obtained maps the values of the features or the feature to a probability value of the associated loading pattern and is a quadratic Bayesian classifier. The probability value forms the parameter K for the stability of the loading pattern.

In the actual method to control the robot system to load equipment 10 with general cargo units 12 or, respectively, to control the movements of the gripper unit 14 to grip the general cargo units 12, the control unit 16 makes a decision about the stability of a proposed loading pattern by means of the Bayesian classifier. The loading corresponding to the loading pattern is only conducted if the proposed loading pattern probably satisfies the required stability criteria.

Additional embodiments of the invention are conceivable in which incorrect estimates of the stability can also be detected in normal operation and the corresponding information can be returned to the control unit 16 so that a continuous learning from mistakes is enabled.

Although modifications and changes may be suggested by those skilled in the art, it is the intention of the inventor to embody within the patent warranted hereon all changes and modifications as reasonably and properly come within the scope of his contribution to the art.

I claim as my invention:

1. A robot system comprising:
    a robot having a gripper unit configured to grip general cargo units;
    a control unit configured to control movements of said gripper unit to stack said general cargo units in a stack according to a loading pattern; and
    said control unit being configured to set said loading pattern of said stack of general cargo units by applying at least one stability-affecting attribute, selected from the group consisting of stability-affecting attributes of said general cargo units and stability-affecting attributes of said stack, to an approximation function to generate at least a probability value that characterizes stability of said loading pattern, and to stack said general cargo units in said stack only according to a loading pattern for which said probability value parameter generated by said approximation function indicates that said stack will be stable.

2. A robot system as claimed in claim 1 wherein said control unit is configured to set said loading pattern by selecting a loading pattern, from among a plurality of stored loading patterns, dependent on said probability value.

3. A robot system as claimed in claim 1 wherein said control unit is configured to use, as said at least one stability-affecting attribute, respective positions of said general cargo units in said stack.

4. A robot system as claimed in claim 1 wherein said control unit is configured to use, as said at least one stability-affecting attribute, respective sizes of the general cargo units in said stack.

5. A robot system as claimed in claim 1 wherein said control unit is configured to use, as said at least one stability-affecting attribute, respective weights of said general cargo units in said stack.

6. A robot system as claimed in claim 1 wherein said stack of general cargo unit has a footprint on a bearing surface on which the stack is supported, and wherein said control unit is configured to use, as said at least one stability-affecting attribute, a ratio of a size of said footprint to a size of said bearing surface.

7. A robot system as claimed in claim 1 wherein said control unit is configured to calculate a position of a center of gravity of a cargo component in said stack of general cargo units, said cargo component being selected from the group consisting of one of said general cargo units and a group of said general cargo units, and to use said center of gravity of a cargo component as said at least one stability-affecting attribute.

8. A robot system as claimed in claim 7 wherein said control unit is configured to calculate a distance of the center of gravity of said cargo component from a tipping edge of said cargo component, and to use said distance as said at least one stability-affecting attribute.

9. A robot system as claimed in claim 8 wherein said control unit is configured to use, as said at least one stability-affecting attribute, a ratio of said distance to a height of said cargo component.

10. A robot system as claimed in claim 9 wherein said control unit is configured to calculate a tipping resistance variable representing a tipping resistance of said cargo component, by calculating a ratio of a tipping moment, that is required to tip said cargo component, to a standing moment of said cargo component, and to use said tipping resistance as said at least one stability-affecting attribute.

11. A robot system as claimed in claim 9 wherein said control unit is configured to calculate a bearing force acting on a cargo component, selected from the group consisting of one of said general cargo units and a group of said general cargo units, from a weight of said cargo component and vertical force components transferred to said cargo component by other general cargo units in said stack, and to use said bearing force acting on a cargo component as said at least one stability-affecting attribute.

12. A robot system as claimed in claim 1 wherein said control unit is configured to use, as said approximation function an approximation function that generates a density of said loading pattern.

13. A robot system as claimed in claim 1 wherein said control unit is configured to use, as said approximation function an approximation function that calculates forces propagating through said stack of general cargo units.

14. A robot system as claimed in claim 1 wherein said control unit is configured to execute a computerized training or learning procedure using a plurality of loading patterns respectively having known stability, and to determine said approximation function as an end result of said training or learning procedure.

15. A robot system as claimed in claim 1 wherein said control unit is configured to use a quadratic Bayesian classifier as said approximation function.

16. A robot system as claimed in claim 1 wherein said control unit is configured to use, as said at least one stability-affecting attribute, only vertical force components within said loading pattern.

17. A method for operating a robot system having a robot with a gripper configured to handle general cargo units, comprising the steps of:
   operating said robot and said gripper to execute movements to stack a plurality of general cargo units in a stack according to a loading pattern, by controlling said robot and said gripper with a computerized control unit;
   in said computerized control unit, automatically setting said loading pattern of said stack of general cargo units;
   in said computerized control unit, applying at least one stability-affecting attribute, selected from the group consisting of stability-affecting attributes of said general cargo units and stability-affecting attributes of said stack, to an approximation function to generate at least a probability value that characterizes stability of said loading pattern;
   from said computerized control unit, automatically stacking said general cargo units in said stack only according to a loading pattern for which said probability value generated by said approximation function indicates that said stack will be stable.

18. A method as claimed in claim 17 wherein said stack has a footprint on a bearing surface on which the stack is supported, and comprising, in said computerized control unit, using, as said at least one stability-affecting attribute, a ratio of a size of said footprint to a size of said bearing surface.

* * * * *